(12) United States Patent
Arbesmeier

(10) Patent No.: US 12,331,832 B2
(45) Date of Patent: Jun. 17, 2025

(54) DRIVE TRAIN AND MOTOR VEHICLE

(71) Applicant: Audi AG, Ingolstadt (DE)

(72) Inventor: Martin Arbesmeier, Allmannstein (DE)

(73) Assignee: AUDI AG, Ingolstadt (DE)

(*) Notice: Subject to any disclaimer, the term of this patent is extended or adjusted under 35 U.S.C. 154(b) by 413 days.

(21) Appl. No.: 17/868,541

(22) Filed: Jul. 19, 2022

(65) Prior Publication Data

US 2023/0024871 A1 Jan. 26, 2023

(30) Foreign Application Priority Data

Jul. 20, 2021 (DE) .......................... 102021118661.7

(51) Int. Cl.
F16H 63/34 (2006.01)
B60K 17/28 (2006.01)

(52) U.S. Cl.
CPC ......... F16H 63/3441 (2013.01); B60K 17/28 (2013.01)

(58) Field of Classification Search
CPC ........................... F16H 63/3441; B60K 17/28
See application file for complete search history.

(56) References Cited

U.S. PATENT DOCUMENTS

| | | | |
|---|---|---|---|
| 2017/0320385 A1* | 11/2017 | Garbo | B60K 6/48 |
| 2018/0056782 A1* | 3/2018 | Lammers | F16H 3/54 |
| 2018/0072154 A1* | 3/2018 | Thompson | B60K 17/043 |
| 2019/0178350 A1* | 6/2019 | Steinberger | B60K 6/442 |
| 2020/0220427 A1* | 7/2020 | Behling | F16D 41/00 |
| 2021/0008979 A1* | 1/2021 | Bindl | B60K 6/547 |
| 2021/0252987 A1* | 8/2021 | Brenninger | F15B 15/18 |
| 2022/0258582 A1* | 8/2022 | Rechenbach | B60K 1/02 |

FOREIGN PATENT DOCUMENTS

| | | |
|---|---|---|
| CN | 110864059 A | 3/2020 |
| DE | 102011100060 A1 | 11/2011 |
| KR | 101462805 B1 | 11/2014 |
| KR | 1020190074644 A | 6/2019 |

* cited by examiner

Primary Examiner — Lori Wu
(74) Attorney, Agent, or Firm — Seed IP Law Group LLP

(57) ABSTRACT

A drive train for a motor vehicle has an electrical machine and a transmission, the drive shaft of which is coupled to the rotor of the electrical machine, wherein the drive train comprises a coupling device which is adapted to couple the drive shaft of the transmission to a power takeoff shaft of the transmission in order to block a rotation of the power takeoff shaft.

9 Claims, 3 Drawing Sheets

DRIVE TRAIN AND MOTOR VEHICLE

BACKGROUND

Technical Field

Embodiments of the invention relate to a drive train for a motor vehicle having an electrical machine and a transmission, the drive shaft of which is coupled to the rotor of the electrical machine. In addition, embodiments of the invention relate to a motor vehicle.

Description of the Related Art

In combustion engines, when the motor vehicle is parked, the engaging of a gear already results in a significant braking torque on account of the internal friction of the combustion engine. Thus, a parked vehicle need not be held in the parked position by a manual brake, or at least not solely by this.

Since only a slight internal friction occurs in electrical machines, additional means are required to provide such a parking brake, if a parking brake implemented by a drive unit is desired. One possibility of doing this is to mount a parking brake designed as a gear on the shaft which is to be braked, which engages with a ratchet radially when a parking function is desired. The ratchet may be lifted out from its detent position for example by an actuator in order to make possible the operation of the motor vehicles after the parking is finished.

The drawback here is that, besides the constantly co-rotating parking brake, a relatively costly actuator with large design space requirement needs to be arranged next to the transmission. Since such an actuator is typically exposed, additional measures are needed to prevent accidental damage to it, for example by being knocked off, and to assure a protection against theft.

Document KR 101462805 B1 proposes using a disk-shaped interlocking element instead of such a radially engaging ratchet, being mounted firm against rotation on the vehicle and being axially movable in relation to the shaft which is to be secured. Projections on the interlock element can engage with recesses on a disk arranged on the shaft in order to block a rotation of this shaft. In this way, although a better vibration resistance of the locking mechanism is achieved and the vibrations put into the shaft during the locking process are reduced, the aforementioned problems involving the arrangement and the consumption of design space for the locking mechanism are still present.

BRIEF SUMMARY

Some embodiments indicate an improved possibility for blocking a shaft of a drive train of a motor vehicle, especially to provide a parking brake function, in particular by achieving a more favorable arrangement and/or less design space consumption of the components required for this.

Some embodiments include a drive train of the kind mentioned above, which comprises a coupling device adapted to couple the drive shaft of the transmission to a power takeoff shaft of the transmission in order to block a rotation of the power takeoff shaft.

The blocking of the power takeoff shaft of the drive train and thus in particular the providing of a parking brake function is thus accomplished not by coupling the power takeoff shaft to a stationary component of the motor vehicle. Instead, the fact is utilized that a coupling of the drive shaft and the power takeoff shaft of the transmission results in a self-locking of the transmission and thus a blocking of the power takeoff shaft thanks to the gear ratio of the transmission being different from 1. As will be further explained below, in this way it is possible to arrange the components needed for the blocking, i.e., especially the coupling device, in an axial prolongation of the electrical machine and thus typically with design space savings in particular. Additionally or alternatively, this can make it possible to integrate the coupling device in a housing of the electrical machine or the transmission, so that the coupling device is well protected against damage and a good theft protection can be realized.

The rotor of the electrical machine can be rigidly coupled to the drive shaft. Alternatively, it would be possible, for example, to use an indirect coupling and provide, e.g., a further coupling device making it possible to decouple the electrical machine from the transmission. The power takeoff shaft can be connected directly or across at least one further component to a driven wheel of the motor vehicle. It is possible, for example, to use separate drive trains for driven wheels. Alternatively, the power takeoff shaft can be connected for example across a differential to the driven wheels, distributing a torque provided by the power takeoff shaft among different wheels or among different driven axles.

The transmission is used to convert a first rotational speed, supplied via the drive shaft, into a second rotational speed of the power takeoff shaft, different from the first rotational speed, as long as the rotational speed of the drive shaft is not equal to 0. In particular, the gear ratio of the transmission may be greater than 1.1 or 1.2 or 1.5. Thus, in particular, a greater torque can be provided on the power takeoff shaft than is supplied by the electrical machine to the drive shaft. This can make it possible to use relatively small-sized electrical machines, which need to provide relatively small torques at high rotational speeds, for example. Alternatively, it would also be possible to use a transmission with a gear ratio smaller than 0.9 or 0.8 or 0.5.

The drive shaft of the transmission and the power takeoff shaft of the transmission are arranged coaxially.

The drive shaft of the transmission can be in particular a hollow shaft, while the power takeoff shaft of the transmission runs inside this hollow shaft, or conversely. In this case, the coupling device can be especially compact in design. For example, it can be arranged on the hollow shaft or the shaft running inside this hollow shaft and rotate along with it.

The coupling device and the transmission can be arranged on mutually opposite sides of the electrical machine looking in the axial direction of the electrical machine. This is especially easy to realize when, as mentioned above, one of the shafts is designed as a hollow shaft and the other shaft is led through the hollow shaft. Thanks to arranging the coupling device and the transmission on mutually opposite sides of the electrical machine, it easily becomes possible, for example, to integrate the coupling device in a housing of the electrical machine. In general, the described arrangement can simplify the servicing of the transmission and/or the coupling devices.

The coupling device in an open coupling condition in which the drive shaft of the transmission can rotate relative to the power takeoff shaft of the transmission can either be coupled to the drive shaft or to the power takeoff shaft. Thus, the coupling device in the open coupling condition rotates together with the drive or power takeoff shaft. In this way, the coupling device can be designed and arranged in an especially space-saving manner. Alternatively, it would be possible, for example, to use a non-co-rotating coupling device, which clutches onto both shafts when switching to the closed coupling condition.

The coupling device is configured as a claw coupling. For example, it may comprise a claw crown which is movably mounted on the drive shaft and the claws of which engage with recesses of the power takeoff shaft or a flange mounted thereon, or conversely. Alternatively, other designs of coupling devices can be used, such as are known from conventional manual or dual clutch transmissions. For example, it would be possible to design the coupling device as a brake mechanism, so that upon closing the coupling device the drive shaft is firmly braked against the power takeoff shaft, or the like.

The transmission may be a spur gear transmission or a planetary transmission. In the case of a spur gear transmission, a spur gear transmission with intermediate shaft may be used, especially one with precisely one intermediate shaft.

In the case of a planetary transmission, this will be used in the twin shaft or forced operation. Since it is typically desirable for the electrical machine or the drive shaft to operate at a higher speed than the power takeoff shaft, the drive shaft can engage with the sun gear and the power takeoff shaft with the planet carrier, for example when using a stationary ring gear. Alternatively, a stationary sun gear could be used, the drive shaft could be coupled to the ring gear, and the power takeoff shaft coupled to the planet carrier.

The electrical machine may comprise a housing, and the coupling device is arranged inside this housing. In this way, an robust protection against theft and/or damage can be achieved.

Besides the drive train, embodiments of the invention relate to a motor vehicle comprising a drive train as described herein.

BRIEF DESCRIPTION OF THE SEVERAL VIEWS OF THE DRAWINGS

Further advantages and details will emerge from the following embodiments as well as the corresponding drawings.

DETAILED DESCRIPTION

Figure 1:
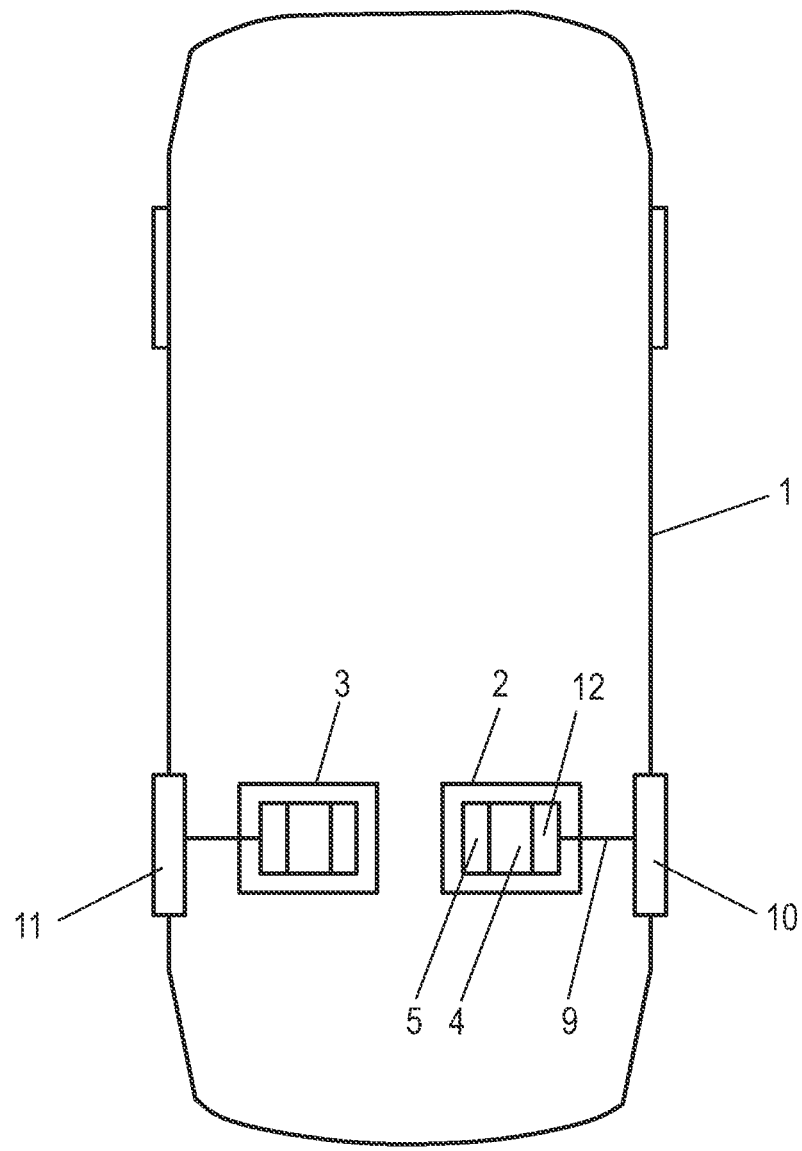
FIG. 1 shows an embodiment of a motor vehicle, comprising embodiments of drive trains.

FIG. 1 shows a motor vehicle 1, having two separate drive trains 2, 3, respectively driving the rear wheels 10, 11 of the motor vehicle 1. Alternatively, it would be possible, for example, for the power takeoff shaft 9 of the respective drive train 2, 3 to not directly drive a wheel of the motor vehicle 1, but instead to drive a differential, for example, which distributes the torque provided by the drive train 2, 3 among different axles or wheels of the motor vehicle 1.

The respective drive train 2, 3 comprises an electrical machine 4, which drives the power takeoff shaft 9 across a transmission 5. Moreover, a coupling device 12 is provided in the respective drive train 2, 3, by which the power takeoff shaft 9 can be blocked, in particular, to provide a parking brake function.

One possible implementation of such a drive train with a parking brake function shall be explained more closely in the following with reference to FIG. 2 on the example of the drive train 2. The electrical machine 4 used in this case is an internal rotor motor, where the rotor 7 is mounted to turn inside the stator 8. The drive shaft 6 in the example is rigidly coupled to the rotor 7 and formed as a hollow shaft. The transmission 5 couples this drive shaft 6, in the example having a firmly predetermined gear ratio, to the power takeoff shaft 9. The power takeoff shaft 9 is led coaxially to the drive shaft 6 and extends inside the drive shaft 6, formed as a hollow shaft. This makes it possible to arrange the transmission on the side of the electrical machine 4 facing away from the wheel or coupling device.

The coupling device 12 in the example is configured as a claw coupling, so that by displacing the components 13 mounted for example on the drive shaft 6 in the direction of the arrow 14, projections of the components 13 can engage with recesses of the power takeoff shaft 9, so that the drive shaft 6 and the power takeoff shaft 9 can be coupled together firm against rotation. In this way, the coupling device can be moved from the open coupling condition 29 shown in FIG. 2 to the closed coupling condition 30 shown in FIG. 3.

Figure 3:
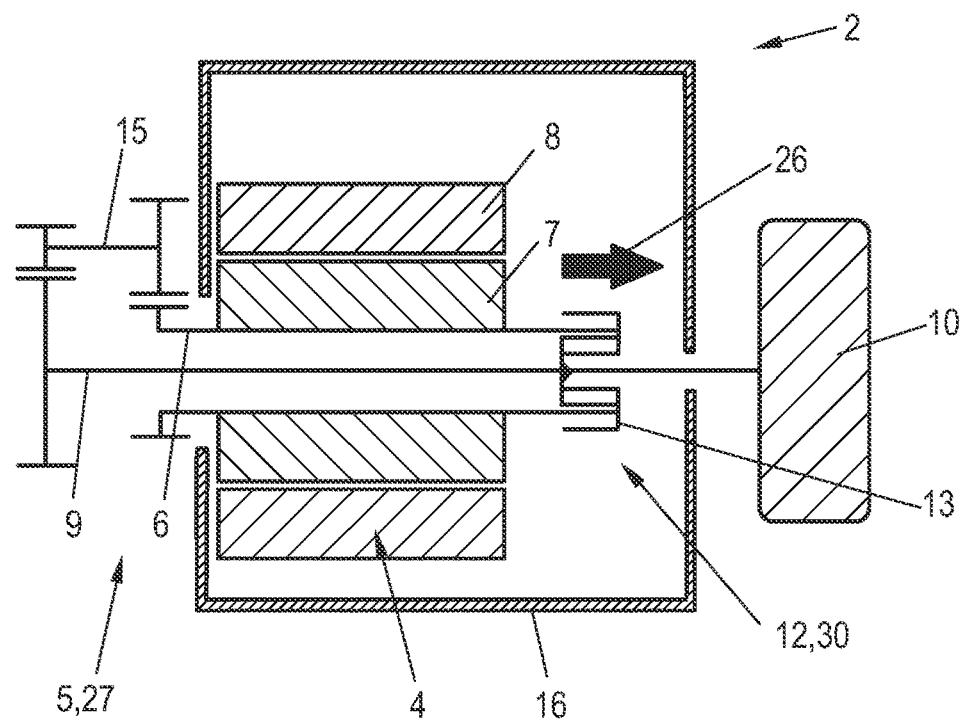
FIG. 3 shows a detail view of a drive train shown in FIG. 1 in a second coupling state of the coupling device.

Thus, in the closed coupling condition 30 of the coupling device 12 as represented in FIG. 3, the drive shaft 6 and the power takeoff shaft 9 are coupled together by the coupling device 12 with a gear ratio of 1:1, while they are at the same time coupled together across the transmission 5 with a different gear ratio. Because of these couplings with different coupling ratios, both the drive shaft 6 and the power takeoff shaft 9 must necessarily have a rotational speed of 0, so that the rotation of the power takeoff shaft 9 is blocked and a parking brake function can be provided, for example. To release the parking brake function, the component 13 can be moved again in the direction represented by the arrow 26, in order to release the coupling of drive shaft 6 and power takeoff shaft 9 by the coupling device 12.

Figure 4:
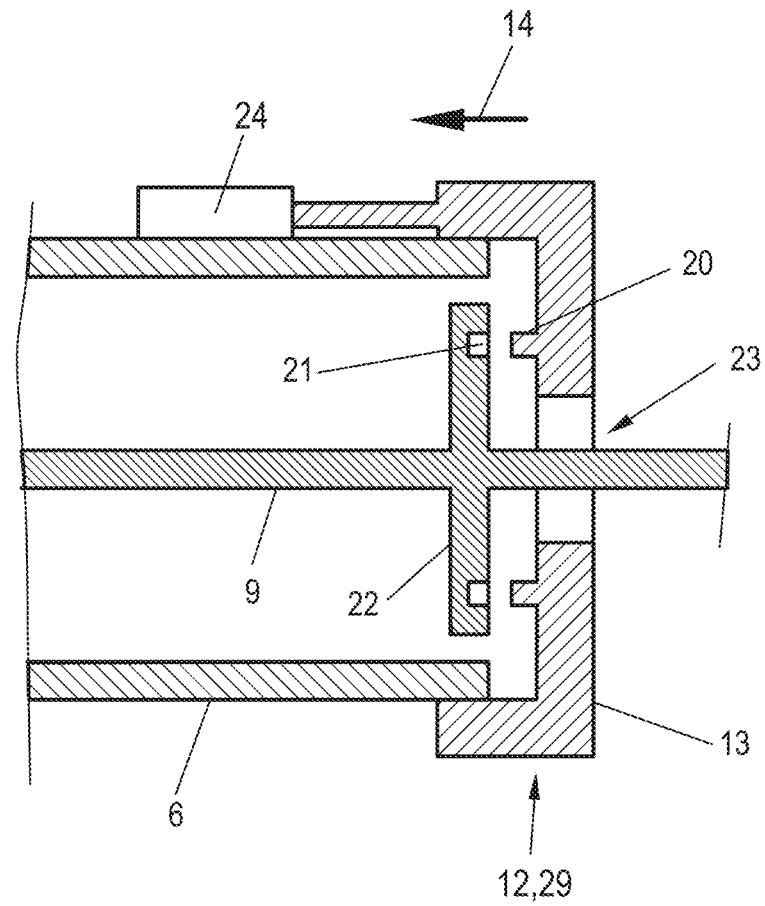
FIG. 4 shows a detail view of one possible configuration of the coupling device in the drive train shown in FIG. 1 to FIG. 3.

One possible configuration of the coupling device 12 is represented in FIG. 4 in detail. Here, the component 13 is disk-shaped and mounted firm against rotation on the drive shaft 6, but it can move in the direction of the arrow 14. The drive shaft 6 furthermore carries the actuator 24, by which the linear movement of the component 13 in the direction of the arrow 14 can be driven.

The power takeoff shaft 9 is led through an opening 23 of the component 13 and thus in the position of the component 13 as shown in FIG. 4 it can rotate freely relative to the component 13 and the drive shaft 6. However, if the component 13 is pulled by the actuator 24 in the direction of the arrow 14, projections 20 or claws of the component 13 will engage in recesses 21 of a disk 22, which is rigidly coupled to the power takeoff shaft 9. In this way, a claw coupling is implemented, which rigidly couples together the drive shaft and the power takeoff shaft 6, 9 in the closed coupling condition 30 shown in FIG. 3. To release this coupling, the actuator 24 can be operated once more to move the component 13 to the right in FIG. 4 and thus produce once more the open coupling condition 29 represented in FIG. 4.

Figure 2:
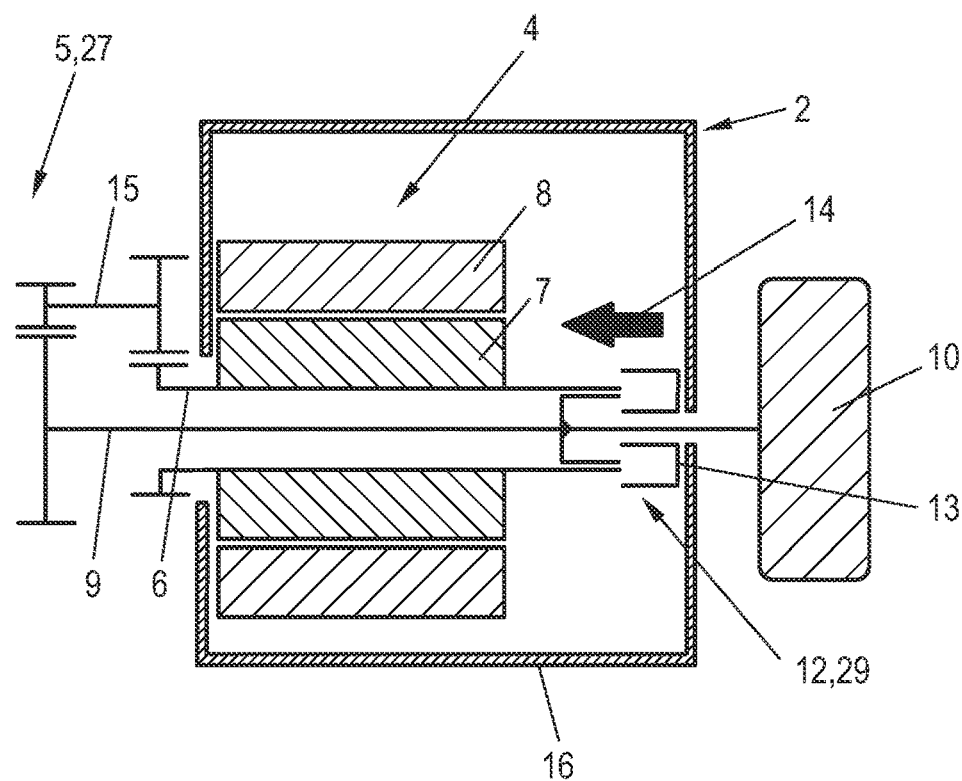
FIG. 2 shows a detail view of a drive train shown in FIG. 1 in a first coupling state of a coupling device.

As is shown in FIGS. 2 and 3, the coupling device 12 can be arranged inside a housing 16 of the electrical machine 4. In this way, the coupling device 12 is well protected against damage and theft.

Figure 5:
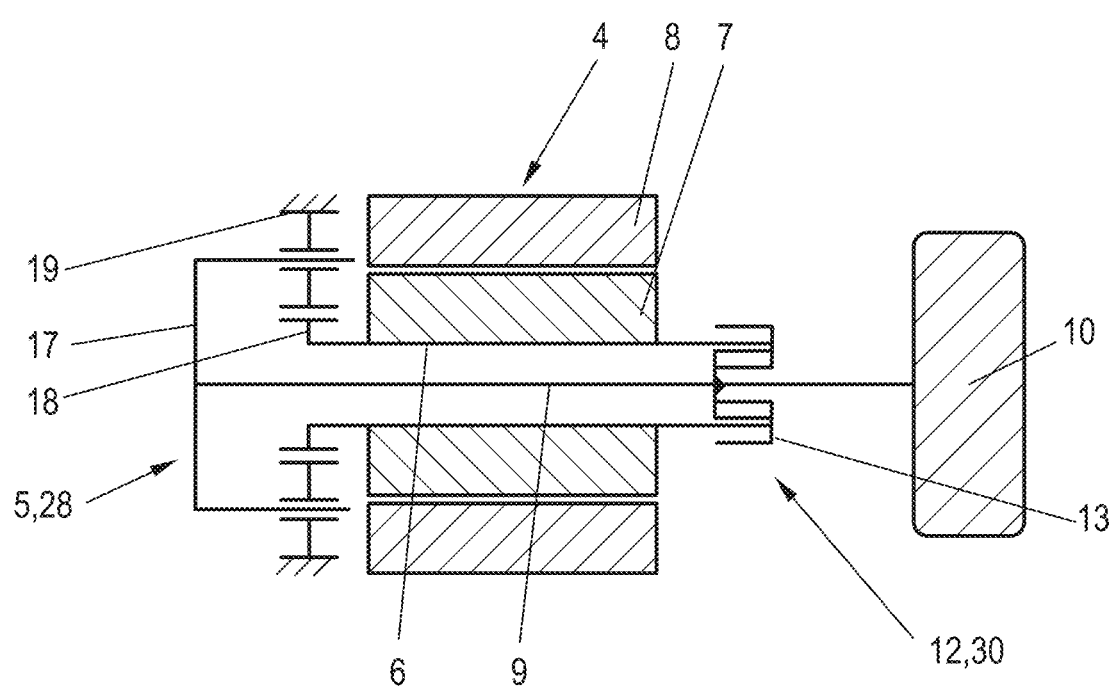
FIG. 5 shows a further embodiment of a drive train.

In the example explained in FIGS. 2 and 3, the transmission 5 is configured as a spur gear transmission 27 having precisely one intermediate shaft 15. Alternatively, it may be advantageous to design the transmission 5, as shown in FIG. 5, as a planetary transmission 28 used in twin-shaft operation. In order to make it possible for the rotor 7 of the electrical machine 4 to turn faster than the power takeoff shaft 9, so that typically a more compact electrical machine 4 can be used, the drive shaft 6 is coupled to the sun gear 18, while the power takeoff shaft 9 is coupled to the planet carrier 17 and the ring gear 19 is stationary and secured for example to a housing of the electrical machine 4, not shown in FIG. 5. Also in this case, the coupling device 12 can be configured as explained above. The same coupling device 12 can thus be used with different transmissions 5, according to the need.

German patent application no. 10 2021 118661.7, filed Jul. 20, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A drive train for a motor vehicle, comprising:
an electrical machine including a rotor;
a transmission including a drive shaft coupled to the rotor of the electrical machine, the transmission having a fixed gear ratio to transmit rotation from the drive shaft to a power takeoff shaft and the transmission being configured such that the drive shaft and the power takeoff shaft are configured to rotate at different rotational speeds when both the drive shaft and the power takeoff shaft are in motion; and
a coupling device which is adapted to couple the drive shaft of the transmission to the power takeoff shaft of the transmission to block a rotation of the power takeoff shaft.

2. The drive train according to claim 1, wherein the drive shaft of the transmission and the power takeoff shaft of the transmission are arranged coaxially.

3. The drive train according to claim 1, wherein the drive shaft of the transmission is a hollow shaft, while the power takeoff shaft of the transmission runs inside this hollow shaft, or
wherein the power takeoff shaft of the transmission is a hollow shaft, while the drive shaft of the transmission runs inside this hollow shaft.

4. The drive train according to claim 1, wherein the coupling device and the transmission are arranged on mutually opposite sides of the electrical machine looking in the axial direction of the electrical machine.

5. The drive train according to claim 1, wherein the coupling device in an open coupling condition, in which the drive shaft of the transmission can rotate relative to the power takeoff shaft of the transmission, is either coupled to the drive shaft or to the power takeoff shaft.

6. The drive train according to claim 1, wherein the coupling device is configured as a claw coupling.

7. The drive train according to claim 1, wherein the transmission is a spur gear transmission or a planetary transmission.

8. The drive train according to claim 1, wherein the electrical machine comprises a housing, and the coupling device is arranged inside the housing.

9. A motor vehicle comprising a drive train including:
an electrical machine including a rotor;
a transmission including a drive shaft coupled to the rotor of the electrical machine, the transmission having a fixed gear ratio to transmit rotation from the drive shaft to a power takeoff shaft and the transmission being configured such that the drive shaft and the power takeoff shaft are configured to rotate at different rotational speeds when both the drive shaft and the power takeoff shaft are in motion; and
a coupling device which is adapted to couple the drive shaft of the transmission to the power takeoff shaft of the transmission to block a rotation of the power takeoff shaft.

\* \* \* \* \*